Aug. 25, 1964     A. C. MUELLER     3,145,613
MOTION PICTURE CAMERA

Filed Feb. 23, 1962     7 Sheets-Sheet 1

Inventor:
Arthur C. Mueller
By J.R. Hall
Atty

Inventor:
Arthur C. Mueller
By J. R. Hall
Atty

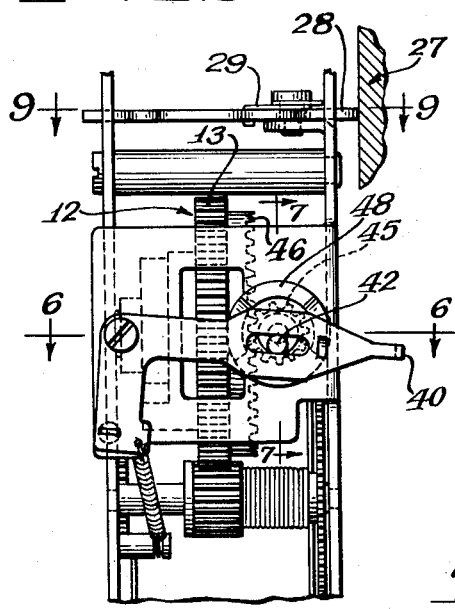
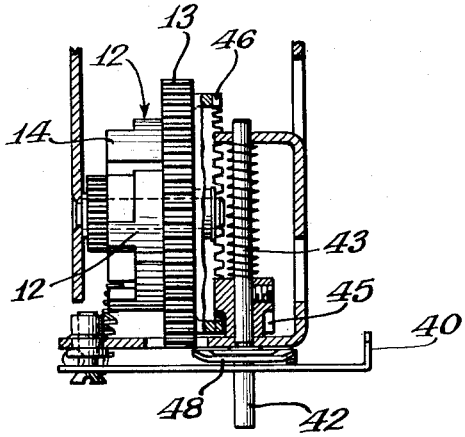
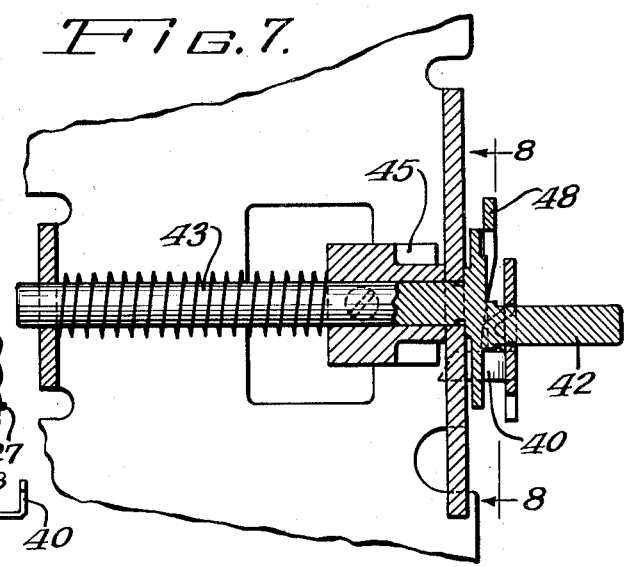
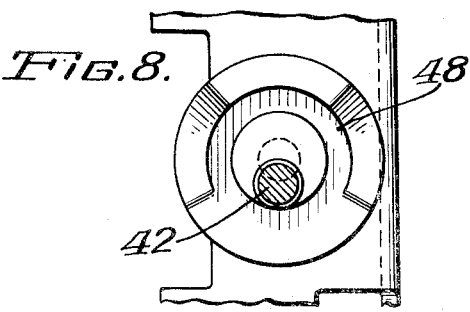

Aug. 25, 1964    A. C. MUELLER    3,145,613
MOTION PICTURE CAMERA
Filed Feb. 23, 1962    7 Sheets-Sheet 5

Inventor:
Arthur C. Mueller
By J. R. Hall
Atty

Aug. 25, 1964

A. C. MUELLER 3,145,613

MOTION PICTURE CAMERA

Filed Feb. 23, 1962

Inventor:
Arthur C. Mueller
By J. R. Hall
Atty

Aug. 25, 1964  A. C. MUELLER  3,145,613
MOTION PICTURE CAMERA
Filed Feb. 23, 1962  7 Sheets-Sheet 7
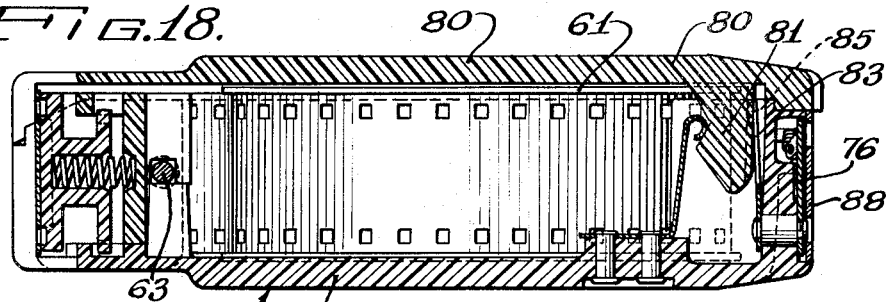
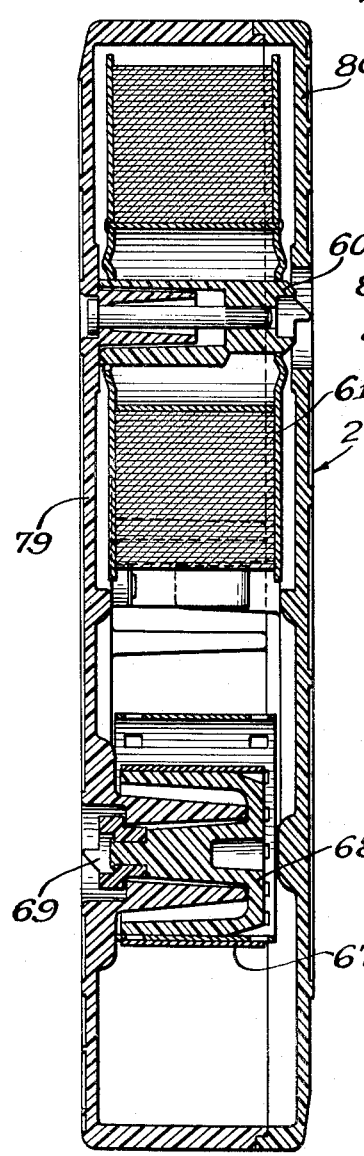
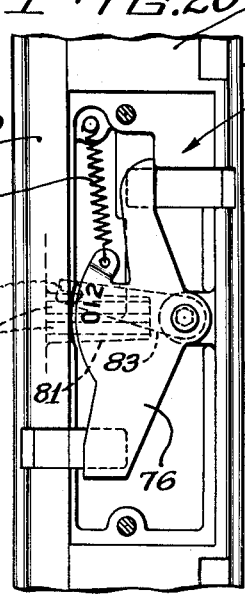
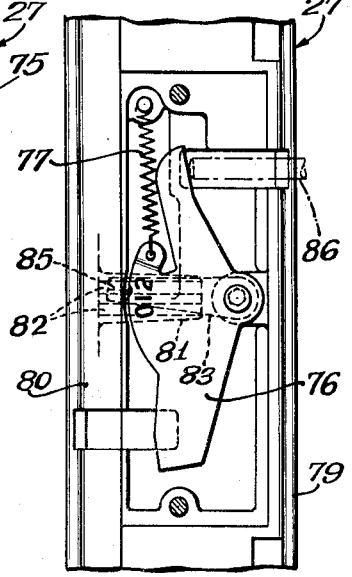
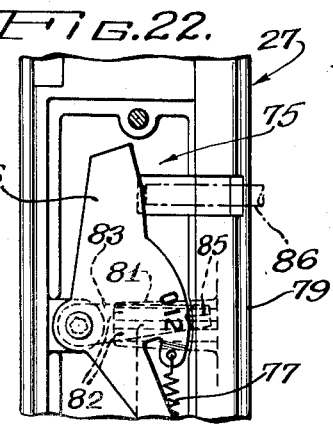
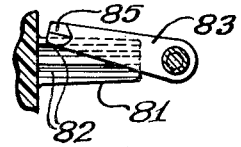
Inventor:
Arthur C. Mueller
By J. R. Hall
Atty

United States Patent Office 3,145,613
Patented Aug. 25, 1964

3,145,613
MOTION PICTURE CAMERA
Arthur C. Mueller, Niles, Ill., assignor to Bell & Howell Company, Chicago, Ill., a corporation of Illinois
Filed Feb. 23, 1962, Ser. No. 175,034
5 Claims. (Cl. 88—16)

This invention relates to a motion picture camera and more particularly to a camera adapted for use with a film cartridge loaded by the user with spool film.

An object of this invention is to provide a footage indicating mechanism having its movement initiated by the insertion of a film cartridge into the camera.

Another object is to provide means in the footage indicating mechanism to stop the camera drive at a point wherein the film is still firmly engaged with the supply reel.

Still another object of this invention is to provide an indicating mechanism on the cartridge actuated by insertion of the cartridge into the camera to show which side, if any, of the cartridge has been exposed.

A complete understanding of the invention may be obtained from the following detailed description of a motion picture camera forming a specific embodiment thereof, when read in conjunction with the appended drawings in which:

FIG. 5 is a partial front elevation view of the camera mechanism;

FIG. 6 is a sectional plan view taken along line 6—6 of FIG. 5;

FIG. 7 is a sectional side view taken along the line 7—7 of FIG. 5;

FIG. 8 is a front view of the shuttle cam taken along the line 8—8 of FIG. 7;

FIG. 9 is a plan view taken along the line 9—9 of FIG. 5;

FIG. 18 is a sectional view of the cartridge taken along line 18—18 of FIG. 14;

FIG. 19 is a front sectional view of the cartridge taken along line 19—19 of FIG. 14;

FIG. 20 is a rear view of the cartridge showing the side exposed indicator in the position assumed when the cartridge is opened;

FIG. 21 is a rear view similar to FIG. 20 showing the indicator in the position assumed when the first side of the cartridge is inserted in the camera;

FIG. 22 is a rear view similar to FIG. 20 showing the indicator in the position assumed when the second side of the cartridge is inserted in the camera; and FIG. 23 is a view showing the pivoted detent member on the cartridge and the grooves on the cartridge cover engaged thereby.

The invention provides a motion picture camera which uses economical spool film while providing the convenience and loading simplicity of a magazine camera. The cartridges used with this camera can be loaded prior to their use and therefore, the possibility of light leaks on the film is practically eliminated. Furthermore, the cartridge is much easier to load since there is no take-up spool as such, the film merely being inserted in a slot. The camera features a footage counter which is actuated by the insertion of a cartridge into the camera. As the footage counter nears the end of the film run the counter will stop the camera drive and prevent further movement of the film. By stopping the film drive with several turns left on the supply reel, one is assured that when the cartridge is turned over for its second run the film will be firmly held by the take-up spool. This is so since the supply spool for the first side of the cartridge is the take-up spool for the second side.

To eliminate any possibility that the user may forget which side, if any, of a cartridge has been exposed, the camera has a member which actuates an indicator on the cartridge to show whether side 1, side 2, or no side has been exposed.

Figure 2:
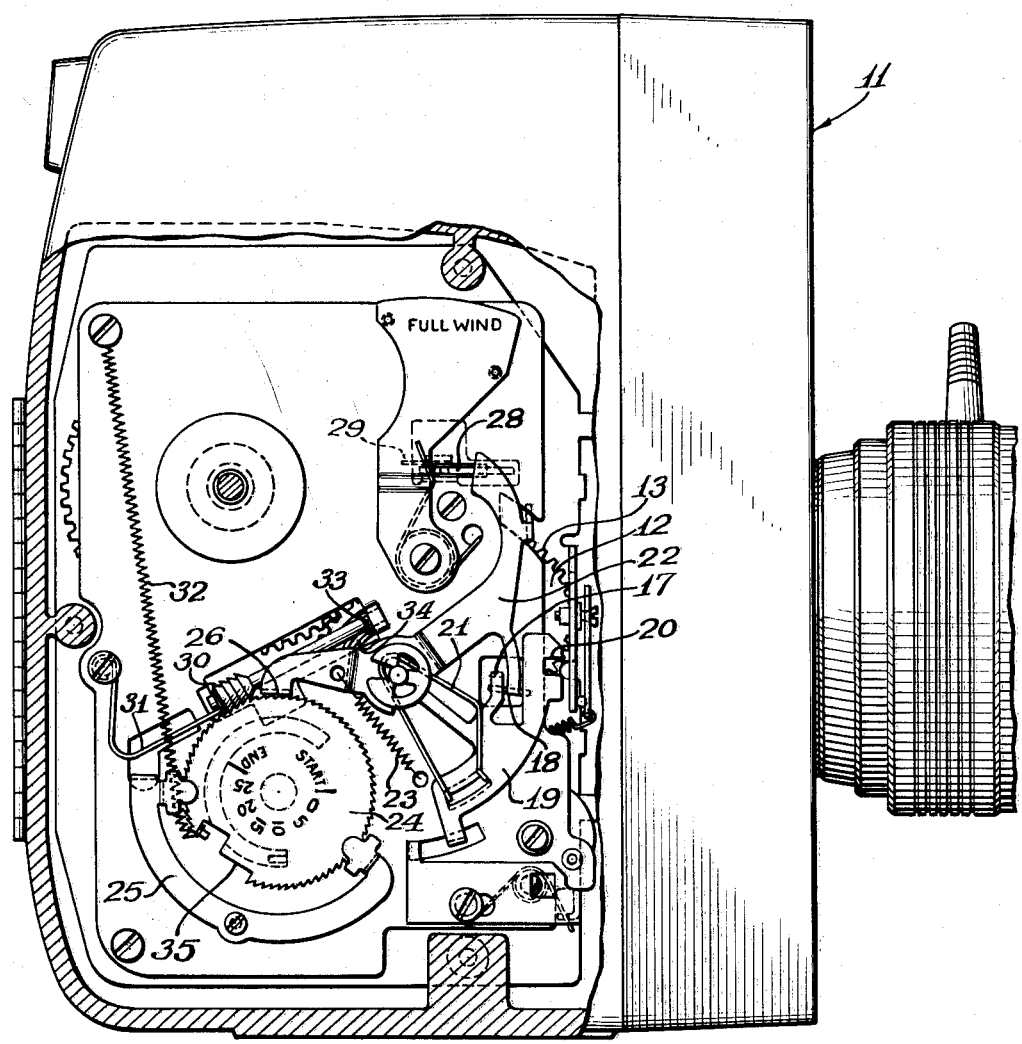
FIG. 2 is a side elevation view of the side of the camera opposite to that shown in FIG. 1 wherein a portion of the camera body has been cut away to expose the footage indicating mechanism in the position assumed after the film cartridge has been loaded into the camera.
Figure 3:
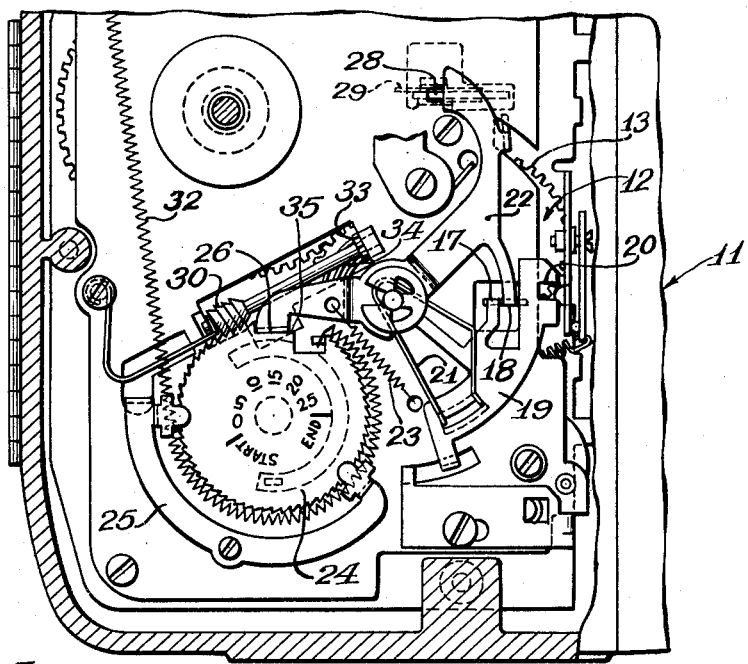
FIG. 3 is a view similar to FIG. 2 showing the footage indicating mechanism in the position assumed after the film has traveled a predetermined distance.
Figure 11:
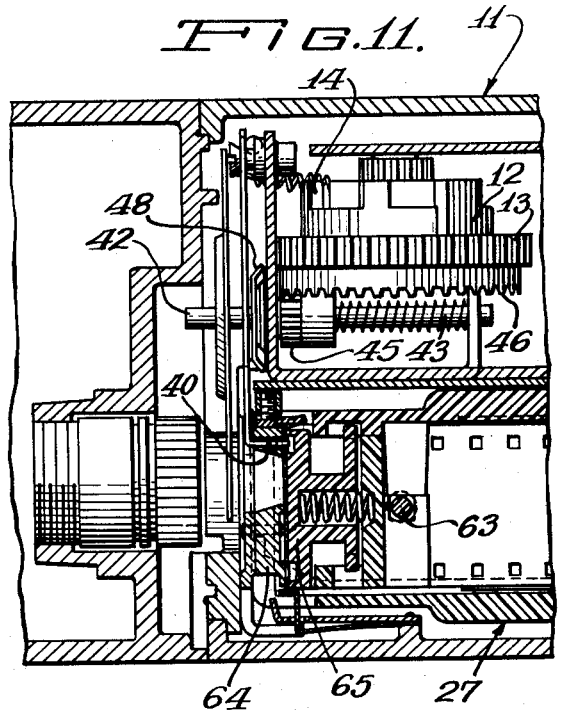
FIG. 11 is a sectional plan view taken just above the film gate.
Figure 12:
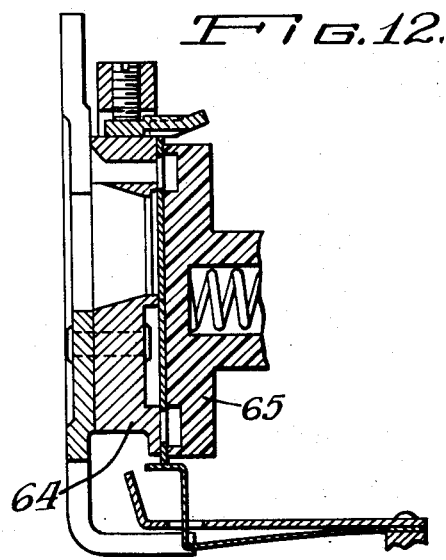
FIG. 12 is an enlarged view of the film gate portion of FIG. 11.
Figure 13:
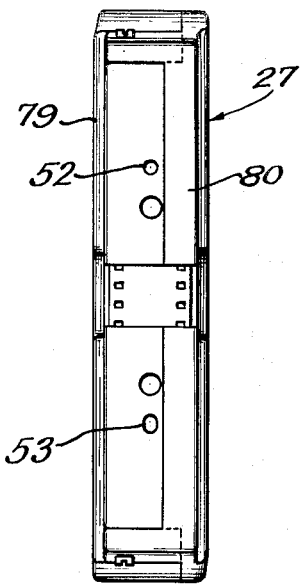
FIG. 13 is a front elevation of a film cartridge adapted for use with the camera shown in FIGS. 1–12.
Figure 14:
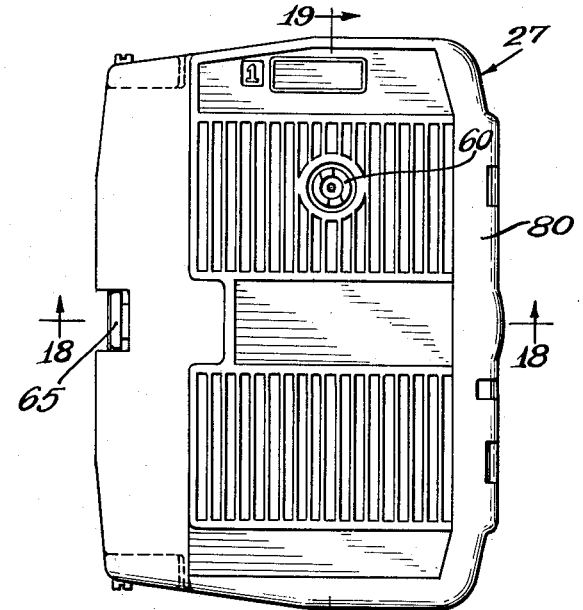
FIG. 14 is a side elevational view of the cartridge shown in FIG. 13.
Figure 15:
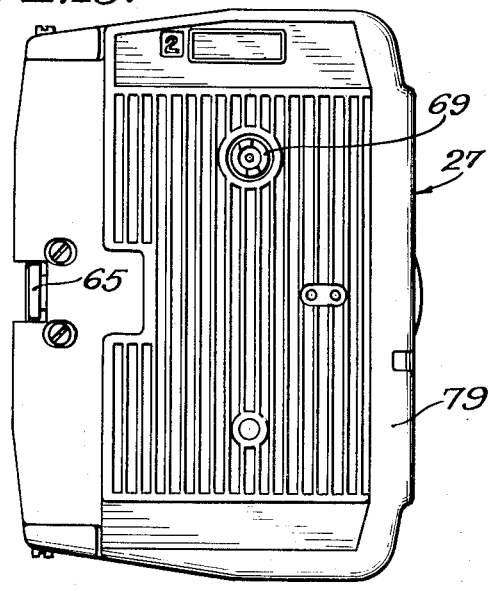
FIG. 15 is a view of the side opposite to that shown in FIG. 14.
Figure 16:
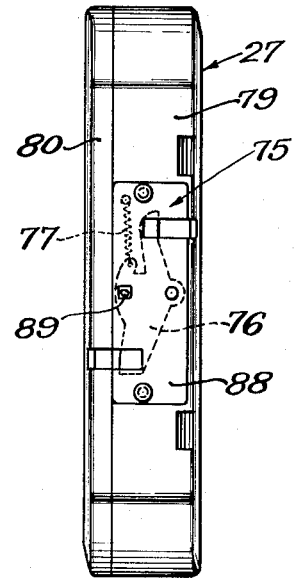
FIG. 16 is a rear elevation of the cartridge.
Figure 17:
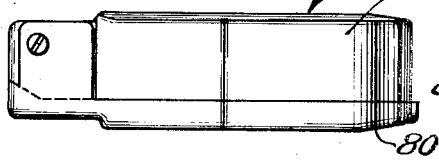
FIG. 17 is a top view of the cartridge.

Referring now in detail to the drawings, there is shown therein a motion picture camera 11 having a cluster gear 12 (FIGS. 2–4 and 11) driven by the camera motor (not shown) through pinion teeth 13 formed on its outer periphery. The cluster gear has projections 14 (FIG. 11) formed integral therewith which are adapted to engage with, and be held from rotating, by one or both of the stopping pawls 17, 18 (FIG. 2). The pawl 17 is integral with the pivoted control member 19. The member 19 is notched at 20 to receive a projection extending from the starter button (not shown) which is mounted for sliding movement on the exterior of the camera. The spring 21 biases the member 19 to a position where the pawl 17 is in stopping engagement with projections 14 on cluster gear 12.

Figure 4:
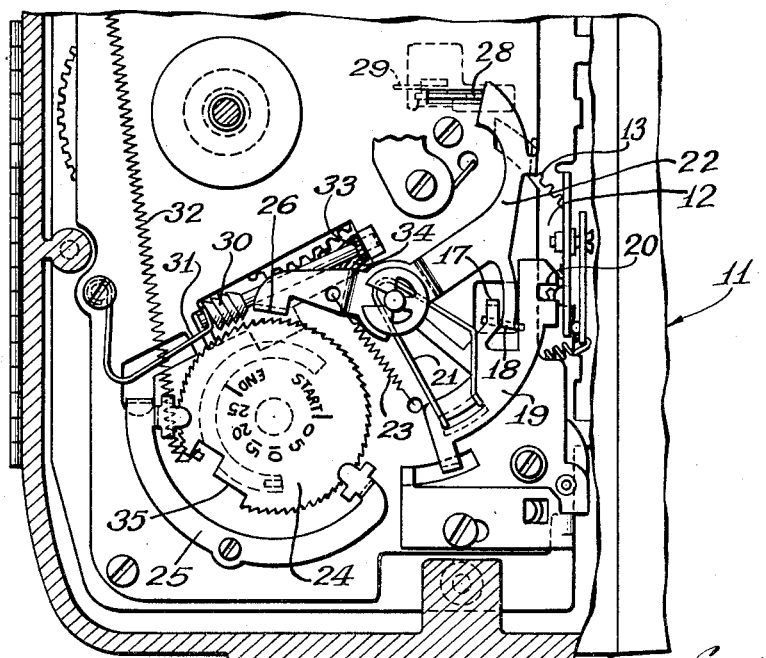
FIG. 4 is a view similar to FIG. 2 showing the footage indicating mechanism in the position assumed when a magazine has been removed from the camera.
Figure 10:
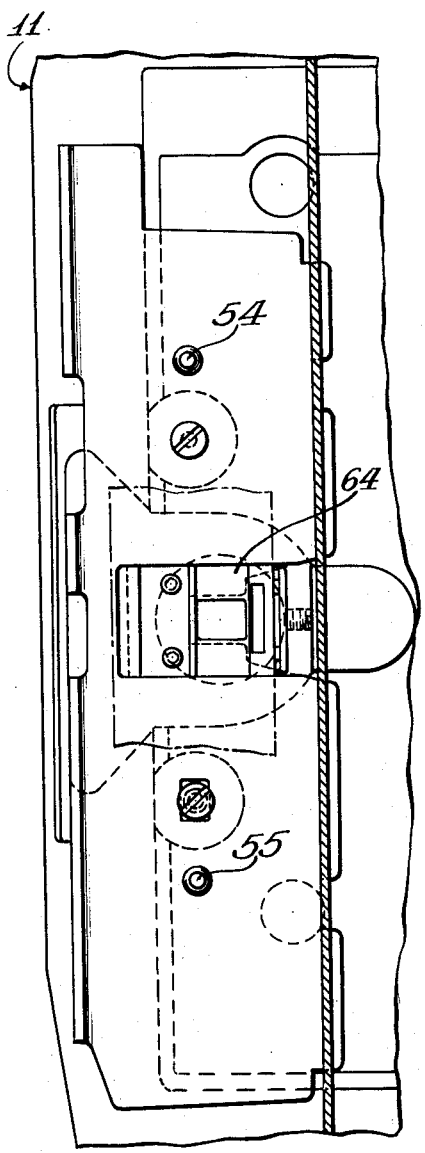
FIG. 10 is a view of the forward portion of the camera from inside the camera with the cartridge removed therefrom.

The pivoted lever 22 which has the stopping pawl 18 integral therewith is biased by spring 23 towards the footage dial 24 (FIG. 2). Dial 24 is held from axial movement by holddown bracket 25. The lever 22 also has a right-angled projection 26 on one end. This projection 26 bears against the periphery of the footage dial 24 as long as the camera has the film cartridge 27 loaded in it. As seen in FIG. 9 a pivoted lever 28 is mounted in the camera and is engaged by a torsion spring 29 tending to pivot it toward the cartridge 27. FIG. 4 shows the camera when the cartridge is not in engagement with lever 28. The torsion spring on lever 28 is stronger than spring 23 on lever 22 so projection 26 will not only be lifted away from the footage dial 24 when the cartridge is removed but will also lift worm gear 30 out of engagement with the toothed periphery of dial 24 against the force of biasing spring 31. With worm 30 out of contact with the footage dial 24, said dial will be rotated to its initial position (FIG. 4) by spring 32. Worm gear 30 is rotated due to its integral connection with pinion 33, while pinion 33 is rotated by spiral gear 34 in the motor gear train. When a cartridge is loaded in the camera (FIG. 2), the lever 28 will be pivoted out of contact with lever 22, thereby allowing projection 26 to contact the dial 24. After the useable portion of the film has been exposed, but before the film on the supply spool in the cartridge has become unattached, the projection 26 (FIG. 3) on lever 22 will drop into recess 35 in footage dial 24. This movement will move stop pawl 18 on lever 22 into engagement with projections 14 on the cluster gear 12 and thereby cause a stoppage of the camera drive regardless of the position of the camera starting button and the stopping pawl 17 controlled thereby.

The camera of the present invention uses a known film drive including a shuttle tooth 40 reciprocated in the film plane by an eccentric pin 42. The pin 42 is integral with shuttle and shutter shaft 43. Shaft 43 is driven through gear 45 by face gear 46 integral with cluster gear 12. The shuttle tooth 40 is moved into and out of the film plane by a lift cam 48 (FIGS. 5–9).

Figure 1:
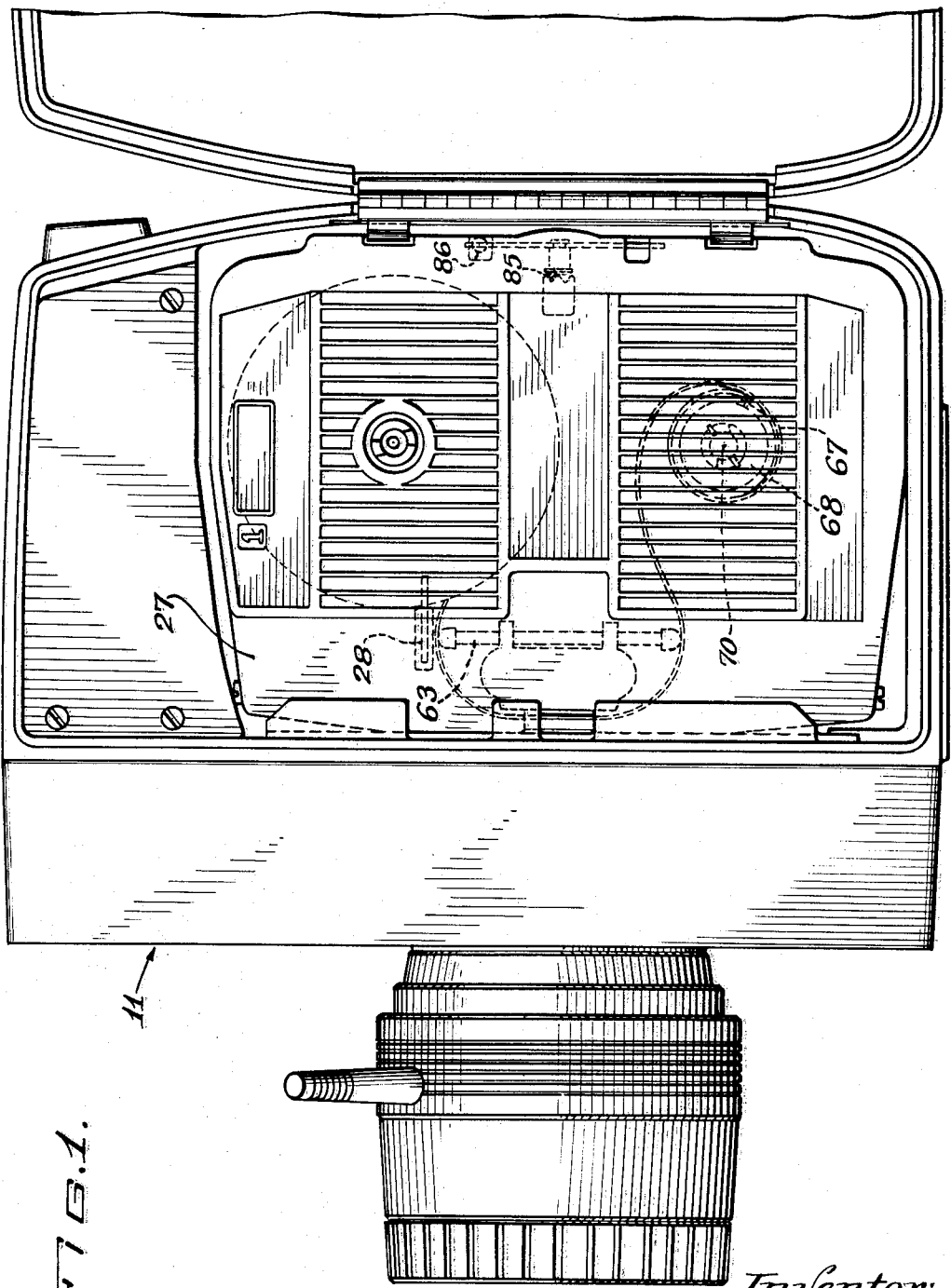
FIG. 1 is a side elevation view of a motion picture camera forming one embodiment of the invention.

FIGS. 13–23 are drawn to the cartridge 27 which is used with the camera previously described. The cartridge has two alinement recesses 52, 53 which engage alinement pins 54, 55 in the camera. The recess 53 is elongated so as to compensate for variations in the spacing of pins 54, 55. FIG. 1 shows the cartridge 27 in place inside the camera 11. The cartridge has a spindle 60 adapted to receive a conventional spool of film 61. The film is threaded around each end of a freely movable bar 63 and between a pressure plate 64 mounted in the camera and a pressure shoe 65 yieldably mounted in the cartridge 27. The end of the film is then inserted under a spring band 67 on a spindle 68. The spindle 68 is mounted for rotation and has a drive portion 69 (FIG. 19) adapted to be driven by a driving member 70 (FIG. 1) in the camera. The bar 63 serves the purpose of feeding the film to and from the spindles in a smooth manner, thus allowing the use of a very short pressure shoe 65.

On the rear face of the cartridge 27 is disposed a side exposure indicator indicated generally by the numeral 75 (FIGS. 16 and 20–23). The indicator device includes a pivoted indicator plate 76 which is biased in a clockwise direction by spring 77. The cartridge has a recessed base portion 79 (FIGS. 17–18) and a cover 80 pivoted thereon. The cover 80 has an integral projection 81 which extends toward the base 79 and includes a pair of V-shaped grooves 82. The base 79 has a spring strip 83 pivoted thereon. The strip 83 has a detent 85 at its outer end which is adapted to engage with the grooves 82 in projection 81. The camera 11 has a pin 86 (FIGS. 1, 21, 22) projecting from its mechanism plate for engagement with the indicator plate 76. The indicator plate 76 is enclosed under a cover plate 88 having an aperture 89 through which one of the three numerals on the indicator plate 76 can be seen. The cover plate 88 bears an inscription such as "This — number shows side exposed." Since the cartridge is designed to be used with double-run 8 mm. spool film the two sides of the cartridge must necessarily bear inscriptions to show which side of the cartridge should be inserted first. If the cartridge is inserted in the camera with its first side up then it is impossible for the user to forget whether or not the film has been exposed.

Briefly, the operation of the invention is as follows: The user loads the cartridge 27 with a spool of film 61 and threads the film under clip 67. Since the cartridge cover 80 is opened, the spring strip 83 and indicator plate 76 are biased to the position shown in FIG. 20. In this position, the indicator plate 76 shows through aperture 89 that side "0" is exposed. When the first side of the cartridge 27 is placed in the camera 11, the pin 86 will push the indicator plate 76 counterclockwise and cause the detent 85 to seat in one of the grooves 82, thereby causing numeral "1" to show through the aperture 89. As the cartridge is placed in the camera it will cause the lever 28 to move out of contact with pivoted lever 22, thereby allowing the same to assume a position where its end projection 26 lies on the periphery of footage dial 24. Before the film is completely run off of spool 61, the projection 26 will fall into recess 35 in the footage dial thereby causing the stopping pawl 18 to contact and stop the cluster gear 12. The cartridge is then removed from the camera. This operation will cause the lever 28 to force the lever 22 out of engagement with the footage dial 24, thereby allowing the latter to return to its starting position. Once the cartridge is removed from the camera the user will have no difficulty trying to remember which side has been exposed since the indicator plate 76 now shows that side "1" has been exposed. As seen in FIG. 21, after the pin 86 has pressed the right end of plate 76 upwards, the left end still has an area which can be pressed so as to rotate the plate 76 to the point where the number "2" will show up in the aperture 89. Such movement will take place (FIG. 22) when the cartridge is inserted in the camera with the second side up. As plate 76 is rotated, the detent 85 will go into the second of the slots 82 so that number "2" will appear beneath aperture 89.

As can be seen from the preceding description, a novel camera and cartridge structure has been presented which allows one to use economical spool film while eliminating the necessity of rethreading a roll of double-run film after one side has been exposed. The structure also can eliminate any problem of film-fogging since several cartridges could be loaded indoors before going out to take movies. By means of the novel indicator mechanism which is actuated by pin 86 in the camera, the cartridge of the present invention prevents double exposures. It also prevents one from sending in unexposed film for processing since the film must be loaded in the camera twice before the indicator will show that the second side has been exposed.

While the invention has been described with respect to a preferred embodiment, it will be understood that various changes and modifications can be made without departing from the spirit of the invention as defined by the appended claims.

I claim:

1. In a motion picture camera of a type adapted for use with double-run film and including means for transporting film past an aperture in said camera, the improvement comprising;
    (a) a cartridge for holding said film, said cartridge including a body portion and a cover portion adapted to be held in locking engagement with the body portion,
    (b) an indicator plate mounted for limited movement on one of said portions,
    (c) means for biasing said indicator plate toward one limit of its movement when the cover is out of locking engagement,
    (d) a pair of cam surfaces on opposite sides of said indicator plate,
    (e) a cam actuating member in said camera adapted to engage and move one of said cam surfaces and thereby move said indicator plate when the cartridge is inserted in the camera prior to exposing the first side of a double-run film, said cam actuating member further being adapted to engage and move the other of said cam surfaces when the cartridge is inserted in the camera prior to exposing the second side of a double-run film,
    (f) means on the indicator plate adapted, when the cover is closed, to engage means on the other of said portions to hold the indicator plate in the positions to which it is moved when the cam surfaces are engaged by the cam actuating member.

2. The improvement in a motion picture camera as defined in claim 1 in which the indicator plate is pivotally mounted.

3. The improvement in a motion picture camera as defined in claim 1 in which said indicator plate has indicia thereon, and wherein said one portion has aperture means adapted to permit various portions of said indicia to be visible according to which of its said positions the indicator plate is in.

4. In a film cartridge adapted for use with spool wound double-run film in a motion picture camera wherein the film is loaded in the cartridge by the user, the improvement comprising;
   (a) body member including a bottom portion and side portions,
   (b) a cover member pivoted on the body member,
   (c) interlocking portions on each of said body and cover members for holding said cover member closed with respect to said body member,
   (d) an indicator plate mounted for limited pivotal movement in a recess in one of said side portions and having indicia thereon for indicating the position of said indicator plate relative to a fixed portion of said one side portion,
   (e) a pair of arms on said indicator plate extending outwardly from the pivot point,
   (f) one of said arms having a cam surface adapted to be engaged through a recess in the bottom portion by a cam actuating member in said camera,
   (g) the other of said arms having a surface adapted to be engaged through a recess in the cover by said cam actuating member when the cartridge is turned over in the camera,
   (h) means on said indicator plate adapted to engage a detent on said cover for locking the indicator plate in one position after the cam surface on said one arm is engaged and moved by the cam actuating member,
   (i) said last named means being adapted to engage a second detent on said cover to lock the indicator plate in a second position after the cam surface on said other arm is engaged and moved by the cam actuating member,
   (j) and resilient means in said cartridge for biasing said indicator plate to a third position when the cover is opened.

5. In a motion picture camera of a type adapted for use with a cartridge containing a roll of double-run film, the improvement comprising;
   (a) a rotatable drive member adapted to drive a film take-up member and a shuttle tooth drive member,
   (b) a stopping projection on said drive member,
   (c) a manually-operable pawl for selectively engaging and disengaging said stopping projection to start and stop said camera,
   (d) a pivoted member adapted to be driven angularly in accordance with the amount of movement imparted to said rotatable drive member,
   (e) a driving member for selectively engaging a portion of the periphery of said pivoted member to drive the same angularly,
   (f) said portion of the periphery having a recess at one point on its surface,
   (g) a lever mounted for limited pivotal movement about a fixed point,
   (h) first means on said lever for selectively engaging the periphery of said pivoted member,
   (i) second means on said lever for selectively disengaging said driving member from said pivoted member,
   (j) a pawl on said lever for selectively engaging the stopping projection on said rotatable drive member,
   (k) first biasing means normally biasing said pivoted member in one direction of angular movement,
   (l) second biasing means normally biasing said driving member into engagement with said pivoted member,
   (m) third biasing means for normally biasing said lever to a position where the first means on the lever is in engagement with the periphery of the pivoted member and the pawl on the lever is out of engagement with the stopping projection on the rotatable drive member,
   (n) actuating means including a fourth biasing means in said camera adapted to move said lever against said second and third biasing means when a cartridge is removed from the camera so that said driving member will be disengaged from said pivoted member permitting said pivoted member to return to the position at one end of its range of angular movement to which it is normally biased by the first biasing means,
   (o) said activating means being moved against said fourth biasing means when a cartridge is inserted into said camera so that said activating means is in a position out of engagement with the lever whereby the first means on said lever will be free to engage the periphery of said pivoted member,
   (p) said first means on said lever being adapted to cooperate with said recess to enter the same when the pivoted member has been driven angularly to a position corresponding to the feeding of a predetermined length of film, less than the total length of the entire roll, through the camera, the movement of said first means into said recess causing the lever to pivot and bring the lever pawl into engagement with the stopping projection regardless of the position of the manually operated pawl.

References Cited in the file of this patent

UNITED STATES PATENTS

| | | |
|---|---|---|
| 2,080,086 | Mihalyi | May 11, 1937 |

FOREIGN PATENTS

| | | |
|---|---|---|
| 199,059 | Austria | Aug. 11, 1958 |
| 435,503 | Germany | Oct. 16, 1926 |
| 656,760 | Germany | Feb. 15, 1938 |
| 810,184 | France | Dec. 19, 1936 |